US011389045B2

(12) United States Patent
Dries

(10) Patent No.: US 11,389,045 B2
(45) Date of Patent: Jul. 19, 2022

(54) DISHWASHING APPLIANCE HAVING A WIRELESSLY POWERED PUMP ASSEMBLY

(71) Applicant: Haier US Appliance Solutions, Inc., Wilmington, DE (US)

(72) Inventor: John Edward Dries, Louisville, KY (US)

(73) Assignee: HAIER US APPLIANCE SOLUTIONS, INC., Wilimington, DE (US)

(*) Notice: Subject to any disclaimer, the term of this patent is extended or adjusted under 35 U.S.C. 154(b) by 52 days.

(21) Appl. No.: 17/093,774

(22) Filed: Nov. 10, 2020

(65) Prior Publication Data

US 2022/0142449 A1 May 12, 2022

(51) Int. Cl.
| A47L 15/42 | (2006.01) |
| A47L 15/00 | (2006.01) |
| F04D 29/18 | (2006.01) |
| F04D 29/043 | (2006.01) |
| F04D 13/06 | (2006.01) |
| H02J 50/05 | (2016.01) |
| H02J 50/12 | (2016.01) |

(52) U.S. Cl.
CPC ......... *A47L 15/4225* (2013.01); *A47L 15/006* (2013.01); *A47L 15/4219* (2013.01); *F04D 13/06* (2013.01); *F04D 29/043* (2013.01); *F04D 29/181* (2013.01); *H02J 50/05* (2016.02); *H02J 50/12* (2016.02)

(58) Field of Classification Search
CPC .............. A47L 15/006; A47L 15/4225; A47L 15/4219; H02J 50/05; H02J 50/12; F04D 13/06; F04D 29/043
See application file for complete search history.

(56) References Cited

U.S. PATENT DOCUMENTS

| 1,119,732 | A | | 12/1914 | Tesla |
| 5,579,789 | A | * | 12/1996 | Spiegel .................. A47L 15/23 241/73 |
| 8,466,583 | B2 | | 6/2013 | Karalis et al. |
| 8,552,592 | B2 | * | 10/2013 | Schatz ..................... H01Q 7/00 307/104 |
| 10,199,870 | B2 | | 2/2019 | Lee et al. |
| 2006/0281435 | A1 | * | 12/2006 | Shearer ................... H02J 50/20 455/343.1 |

(Continued)

FOREIGN PATENT DOCUMENTS

EP 3114766 B1 7/2019

*Primary Examiner* — Benjamin L Osterhout
(74) *Attorney, Agent, or Firm* — Dority & Manning, P.A.

(57) ABSTRACT

A dishwashing appliance may include a cabinet, a tub, a fluid pump, and a wireless power transmitter. The tub may define a wash chamber within the cabinet. The fluid pump may be in fluid communication with the tub for motivating a flow of wash fluid from the tub when activated. The fluid pump may include a fluid impeller rotatably positioned in fluid communication with the wash chamber, and an electric motor in mechanical communication with the fluid impeller to motivate rotation thereof. The wireless power receiver may be in electrical communication with the electric motor. The wireless power transmitter may be spaced apart from the wireless power receiver in operable communication with the wireless power receiver to transmit an electromagnetic field thereto.

20 Claims, 8 Drawing Sheets

(56) References Cited

U.S. PATENT DOCUMENTS

| | | | |
|---|---|---|---|
| 2008/0054745 A1* | 3/2008 | Sentmanat | H02K 21/14 |
| | | | 310/156.01 |
| 2009/0178698 A1* | 7/2009 | Delgado | A47L 15/22 |
| | | | 134/172 |
| 2009/0251113 A1* | 10/2009 | Raghuprasad | A47J 43/085 |
| | | | 322/39 |
| 2010/0192995 A1* | 8/2010 | Bertsch | A47L 15/22 |
| | | | 134/56 D |
| 2011/0226292 A1* | 9/2011 | Ulger | A47L 15/0015 |
| | | | 134/198 |
| 2012/0242159 A1 | 9/2012 | Loou et al. | |
| 2017/0138109 A1* | 5/2017 | Weißnburger | A47L 15/4257 |
| 2018/0020875 A1* | 1/2018 | Kolar | A47J 43/0777 |
| | | | 366/279 |
| 2018/0168425 A1* | 6/2018 | Wilson | A47L 15/22 |
| 2018/0325348 A1* | 11/2018 | Dries | A47L 15/42 |

\* cited by examiner

DISHWASHING APPLIANCE HAVING A WIRELESSLY POWERED PUMP ASSEMBLY

FIELD OF THE INVENTION

The present subject matter relates generally to dishwashing appliances, and more particularly to pump assemblies for dishwashing appliances.

BACKGROUND OF THE INVENTION

Dishwashing appliances generally include a tub defining a wash chamber or compartment wherein one or more rack assemblies, into which various articles may be loaded for cleaning, are positioned. Each rack may include features such as, for example, tines that hold and orient the articles to receive sprays of wash and rinse fluids during the cleaning process. The articles to be cleaned may include a variety of dishes, cooking utensils, silverware, and other items.

During wash and rinse cycles, dishwashing appliances generally circulate a fluid through a wash chamber over articles, such as pots, pans, silverware, etc. The fluid can be, for example, various combinations of water and detergent during the wash cycle or water (which may include additives) during the rinse cycle. After the rinse cycle is complete, a drain cycle can be performed to remove the fluid from the wash chamber. Typically, one or more pumps are provided to motivate the fluid through or from the wash chamber. For example, the fluid within a dishwashing appliance is typically circulated during a given cycle using a circulation pump. Fluid is collected in a sump at or near a bottom of the wash chamber and pumped back into the wash chamber through, for example, nozzles in spray arms and other openings that direct the fluid against the articles to be cleaned or rinsed. After the rinse cycle is complete, the drain pump may be activated to pump fluid out of the wash chamber.

Often, circulation and drain pumps are mounted directly to the tub defining a wash chamber. A watertight seal is generally required between a pump and the tub. This need for a watertight seal can lead to further issues. For instance, great care must be taken when connecting a circulation or drain pump (e.g., an electric motor thereof) to a power source since any opening formed through the pump may risk introducing a leak point wherein moisture may be introduced to an undesired location of the pump, such as an electric motor. This may be especially true if the electric motor is mounted within an often liquid-filled portion of the dishwashing appliance. Existing attempts generally require complex wiring and often require additional openings through the pump, which may create more potential leak points. Even if the electric motor is mounted apart from the rest of the pump, complex mechanical linkages are required to extend through the tub, which also creates potential leak points. In turn, such existing attempts are often unreliable or otherwise unsatisfactory.

As a result, it would be useful to provide an appliance or pump assembly with an improved motor arrangement. In particular, it would be advantageous if such an appliance or assembly could be provided without introducing additional potential leak points such that might be created from additional electrical or mechanical connections through the tub.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dishwashing appliance is provided. The dishwashing appliance may include a cabinet, a tub, a fluid pump, and a wireless power transmitter. The tub may define a wash chamber within the cabinet. The fluid pump may be in fluid communication with the tub for motivating a flow of wash fluid from the tub when activated. The fluid pump may include a fluid impeller rotatably positioned in fluid communication with the wash chamber, and an electric motor in mechanical communication with the fluid impeller to motivate rotation thereof. The wireless power receiver may be in electrical communication with the electric motor. The wireless power transmitter may be spaced apart from the wireless power receiver in operable communication with the wireless power receiver to transmit an electromagnetic field thereto.

In another exemplary aspect of the present disclosure, a dishwashing appliance is provided. The dishwashing appliance may include a cabinet, a tub, a fluid pump, and a wireless power transmitter. The tub may define a wash chamber within the cabinet. The fluid pump may be in fluid communication with the tub for motivating a flow of wash fluid from the tub when activated. The fluid pump may include a fluid impeller rotatably positioned in fluid communication with the wash chamber, and an electric motor in mechanical communication with the fluid impeller to motivate rotation thereof. The wireless power receiver may be mounted within the wash chamber in electrical communication with the electric motor. The wireless power transmitter may be mounted to the cabinet outside of the tub in operable communication with the wireless power receiver to transmit an electromagnetic field thereto.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
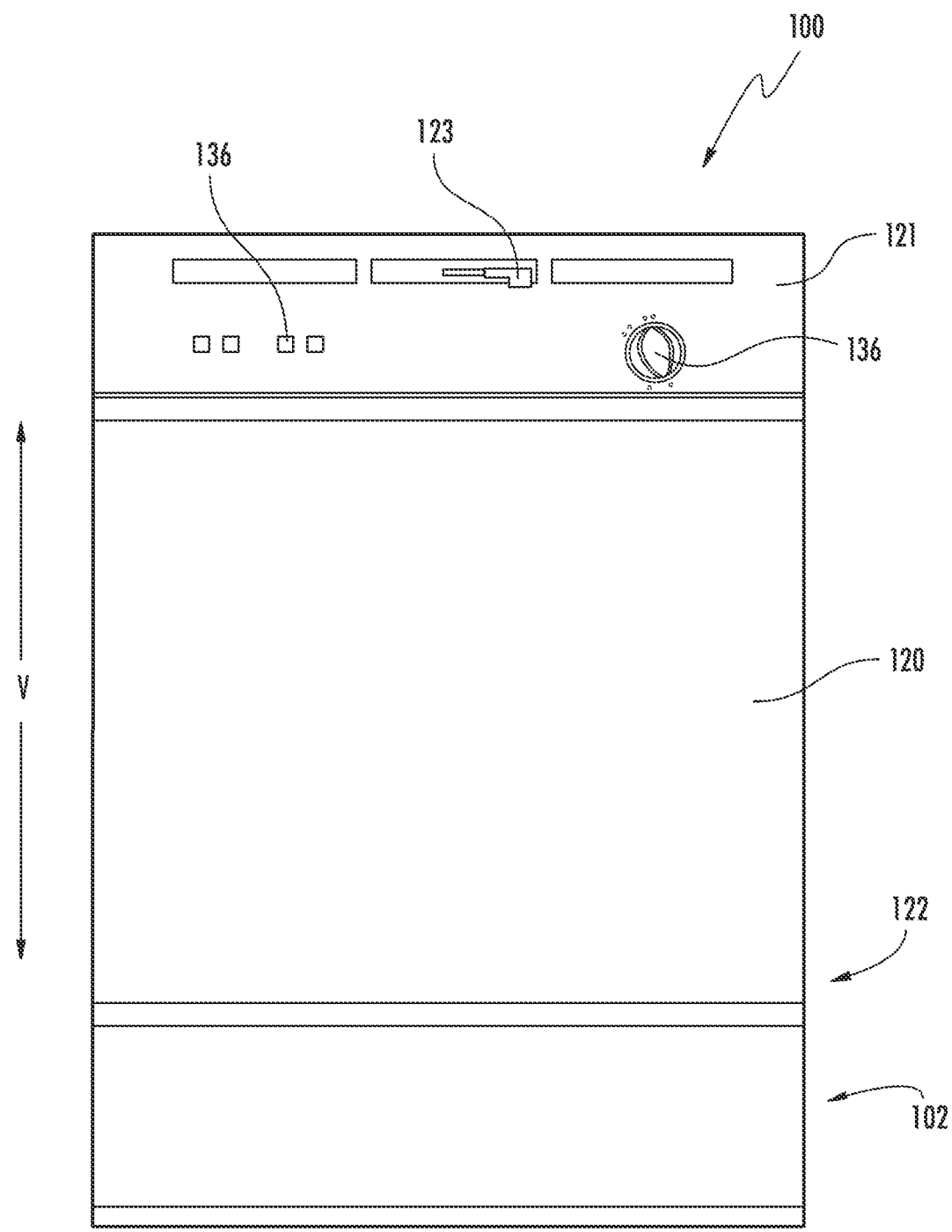
FIG. 1 provides a front elevation view of a dishwashing appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
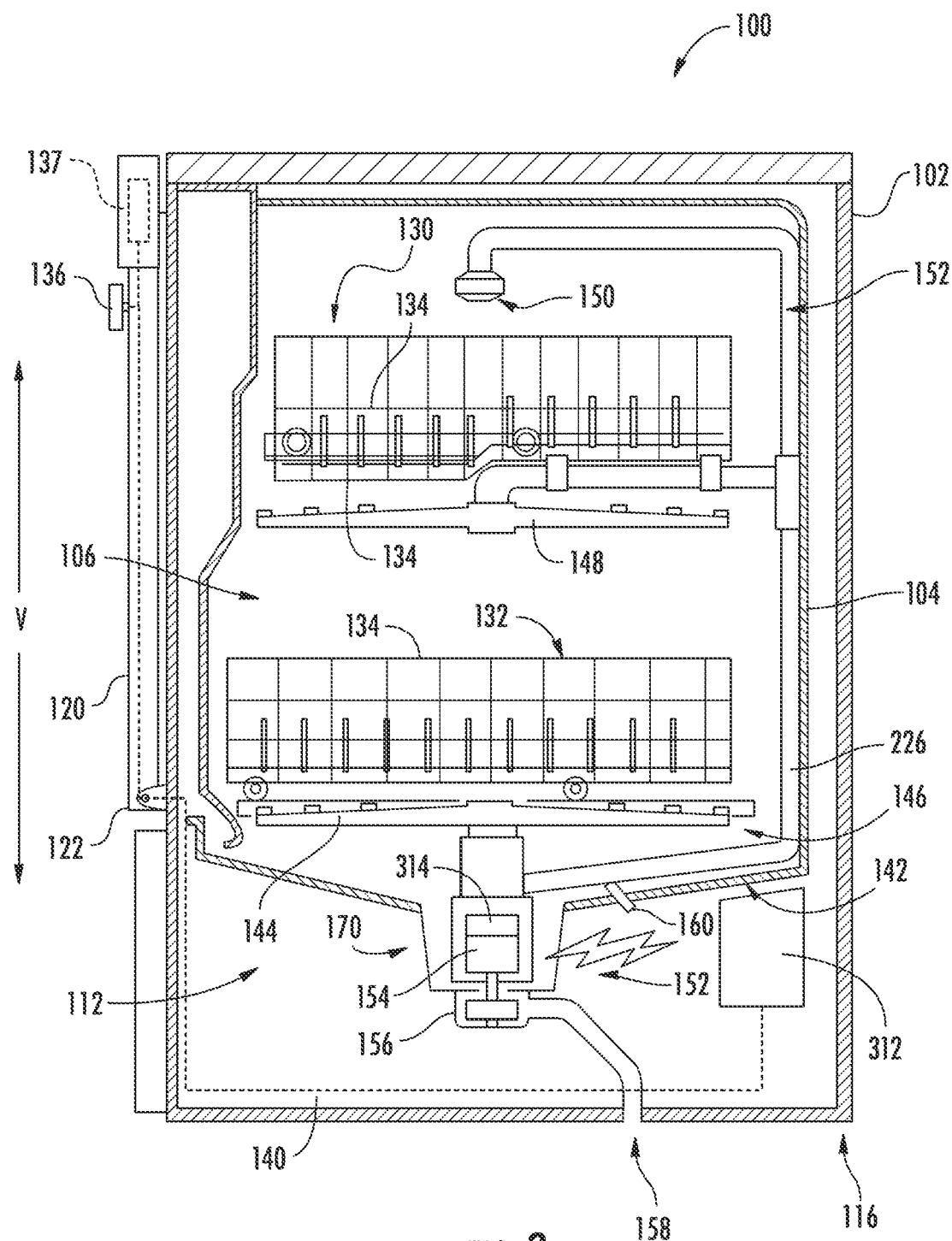
FIG. 2 provides a side, cross-sectional view of the exemplary dishwashing appliance of FIG. 1.
Figure 3:
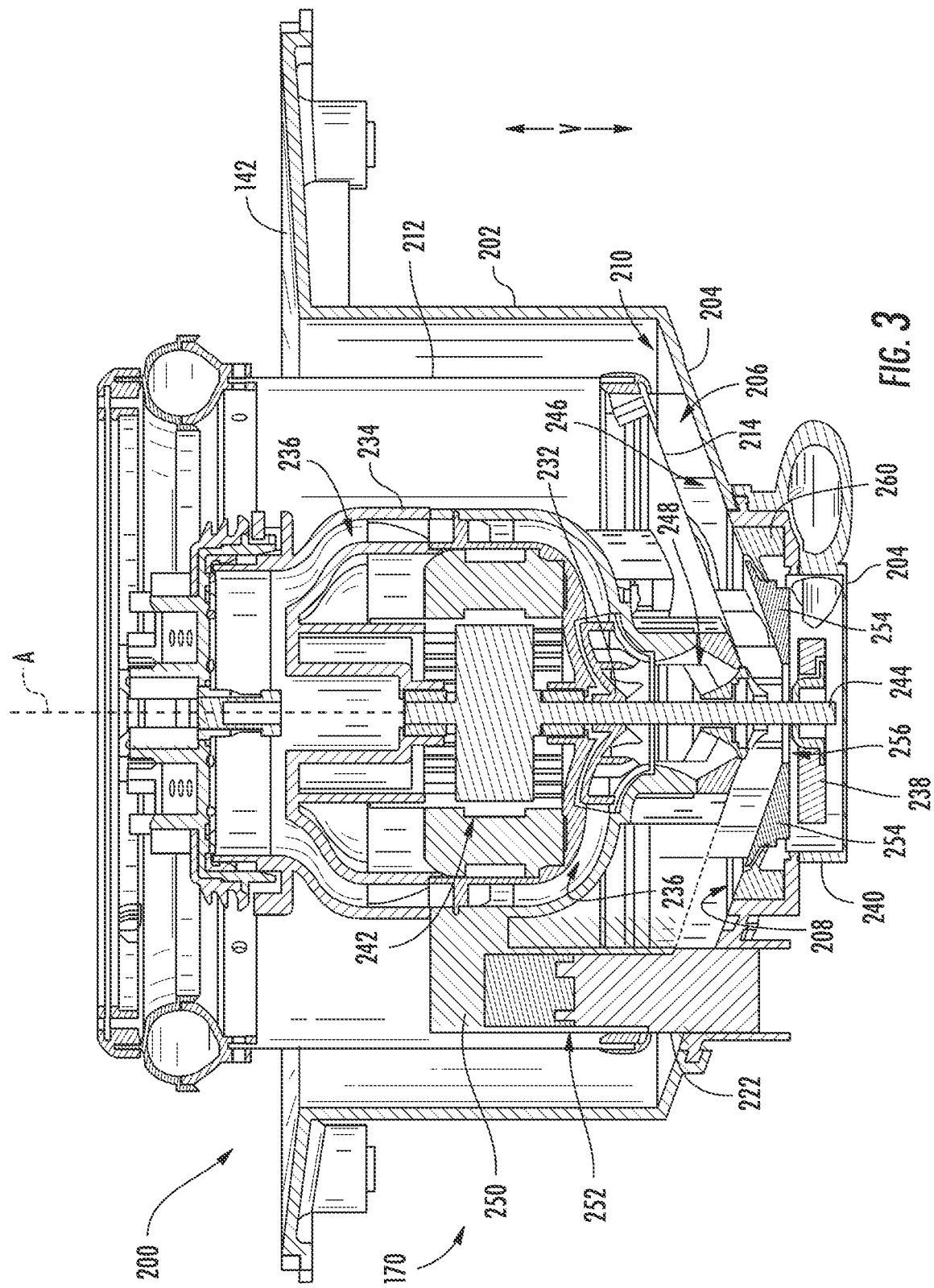
FIG. 3 provides a cross-sectional view of a sump of the exemplary dishwashing appliance of FIG. 1.

FIGS. 1 and 2 depict a dishwashing appliance 100 according to an exemplary embodiment of the present disclosure. As shown in FIG. 1, dishwashing appliance 100 includes a cabinet 102. Cabinet 102 has a tub 104 therein that defines a wash compartment 106. The tub 104 also defines a front opening (not shown). Dishwashing appliance 100 includes a door 120 hinged at a bottom 122 of door 120 for movement between a normally closed, vertical position (shown in FIGS. 1 and 2), wherein wash compartment 106 is sealed shut for washing operation, and a horizontal, open position for loading and unloading of articles from dishwashing appliance 100. In some embodiments, a latch 123 is used to lock and unlock door 120 for access to wash compartment 106. Tub 104 also includes a sump 170 positioned adjacent a bottom portion 112 of tub 104 and configured for receipt of a liquid wash fluid (e.g., water, detergent, wash fluid, or any other suitable fluid) during operation of dishwashing appliance 100.

In certain embodiments, a spout 160 is positioned adjacent sump 170 of dishwashing appliance 100. Spout 160 is configured for directing liquid into sump 170. Spout 160 may receive liquid from, for example, a water supply (not shown) or any other suitable source. In alternative embodiments, spout 160 may be positioned at any suitable location within dishwashing appliance 100 (e.g., such that spout 160 directs liquid into tub 104). Spout 160 may include a valve (not shown) such that liquid may be selectively directed into tub 104. Thus, for example, during the cycles described below, spout 160 may selectively direct water or wash fluid into sump 170 as required by the current cycle of dishwashing appliance 100.

Rack assemblies 130 and 132 may be slidably mounted within wash compartment 106. In some embodiments, each of the rack assemblies 130 and 132 is fabricated into lattice structures including a plurality of elongated members 134. Each rack of the rack assemblies 130 and 132 is generally adapted for movement between an extended loading position (not shown) in which the rack is substantially positioned outside the wash compartment 106, and a retracted position (shown in FIGS. 1 and 2) in which the rack is located inside the wash compartment 106. A silverware basket (not shown) may be removably attached to rack assembly 132 for placement of silverware, utensils, and the like, that are otherwise too small to be accommodated by the racks 130 and 132.

In certain embodiments, dishwashing appliance 100 includes a lower spray assembly 144 that is rotatably mounted within a lower region 146 of the wash compartment 106 and above sump 170 so as to rotate in relatively close proximity to rack assembly 132. Optionally, a mid-level spray assembly 148 is located in an upper region of the wash compartment 106 and may be located in close proximity to upper rack 130. Additionally or alternatively, an upper spray assembly 150 may be located above the upper rack 130.

In exemplary embodiments, lower and mid-level spray assemblies 144 and 148 and the upper spray assembly 150 are fed by a fluid circulation assembly 152 for circulating water and dishwasher fluid in the tub 104. Fluid circulation assembly 152 includes one or more fluid pumps (e.g., a circulation pump 154 or a cross-flow/drain pump 156). Some embodiments include circulation pump 154 positioned at least partially within sump 170 and drain pump 156 positioned below circulation pump 154 in fluid communication with sump 170. Additionally, drain pump 156 may be configured for urging the flow of wash fluid from sump 170 to a drain 158 when activated. By contrast, circulation pump 154 may be configured for supplying a flow of wash fluid from sump 170 to spray assemblies 144, 148 and 150 by way of one or more circulation conduits 226 when activated. Moreover, a filter assembly may be also positioned at least partially in sump 170 for filtering food particles or other debris, referred to herein generally as soils, from wash fluid prior to such wash fluid flowing to circulation pump 154.

As will be described in detail below, one or more pumps (e.g., circulation pump 154 or drain pump 156) are provided as part of a pump assembly 200 that includes an electric motor 242 and wireless power receiver 314 in electrical communication (e.g., wired communication to exchange a current or voltage) with the electric motor 242. Generally, the electric motor 242 is in mechanical communication with one or more fluid impellers 232 or 238 to move (e.g., rotate) impeller 232 or 238 or and urge a fluid flow of wash fluid from the wash chamber. To this end, electric motor 242 is provided as any suitable motor. Optionally, electric motor 242 is a direct current (DC) motor configured to receive a DC voltage. In some such embodiments, electric motor 242 is a relatively low power motor, such as one having a power rating less than or equal to 50 watts (e.g., 40 watts). Thus, the efficiency of power transmission to the motor 242 may be less relevant for the purposes of meeting various governmental efficiency or power consumption requirements.

Spray assemblies 144 and 148 include an arrangement of discharge nozzles or orifices for directing wash fluid onto dishes or other articles located in rack assemblies 130 and 132. The arrangement of the discharge nozzles in spray assemblies 144 and 148 provides a rotational force by virtue of wash fluid flowing through the discharge ports. The resultant rotation of the spray assemblies 144 and 148 provides coverage of dishes and other dishwasher contents with a spray of wash fluid.

Dishwashing appliance 100 is further equipped with a controller 137 to regulate operation of the dishwashing appliance 100. Controller 137 may include a memory (e.g., non-transitive media) and microprocessor, such as a general or special purpose microprocessor operable to execute programming instructions or micro-control code associated with a washing operation. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

Controller 137 may be positioned in a variety of locations throughout dishwashing appliance 100. In the illustrated embodiment, controller 137 may be located within a control panel area 121 of door 120 as shown. In such an embodiment, input/output ("I/O") signals may be routed between controller 137 and various operational components of dishwashing appliance 100 along wiring harnesses that may be routed through the bottom 122 of door 120. Typically, controller 137 includes a user interface panel 136 through which a user may select various operational features and modes and monitor progress of the dishwashing appliance 100. In one embodiment, user interface 136 may represent a general purpose I/O ("GPIO") device or functional block. In one embodiment, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication (e.g., electrical or wired communication) with controller 137 via one or more signal lines or shared communication busses.

It should be appreciated that the subject matter disclosed herein is not limited to any particular style, model or configuration of dishwashing appliance, and that the embodiment depicted in the figures is for illustrative purposes only. For example, instead of the racks 130 and 132 depicted in FIG. 1, dishwashing appliance 100 may be of a known configuration that utilizes drawers that pull out from the cabinet and are accessible from the top for loading and unloading of articles.

In some embodiments, a wireless power transmitter 312 is provided to supply power to one or more electric devices within dishwashing appliance 100. In particular, wireless power transmitter 312 may be mounted on or within cabinet operable communication (e.g., wireless or contact-free communication) with the wireless power receiver 314 to transmit an electromagnetic field thereto, which may then power a pump assembly 200 at the corresponding electric motor 242.

As shown, wireless power transmitter 312 and wireless power receiver 314 may be physically spaced apart at discrete portions of dishwashing appliance 100. When assembled, wireless power transmitter 312 and wireless power receiver 314 may thus be wirelessly coupled without ever coming into direct or electrical contact. In turn, an air gap may be maintained between the two.

Figure 4:
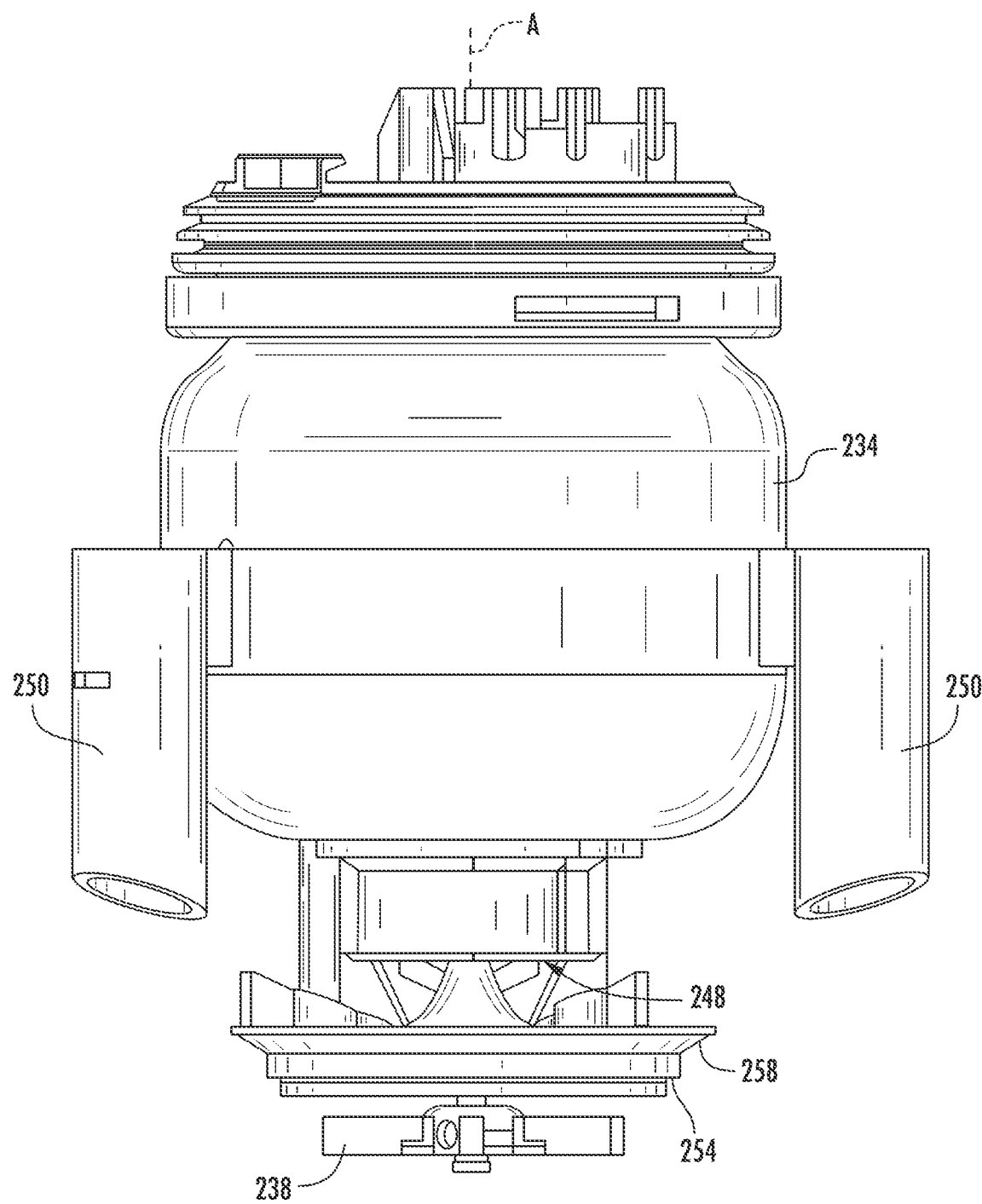
FIG. 4 provides a side perspective view of a pump assembly of the exemplary dishwashing appliance of FIG. 1.
Figure 5:
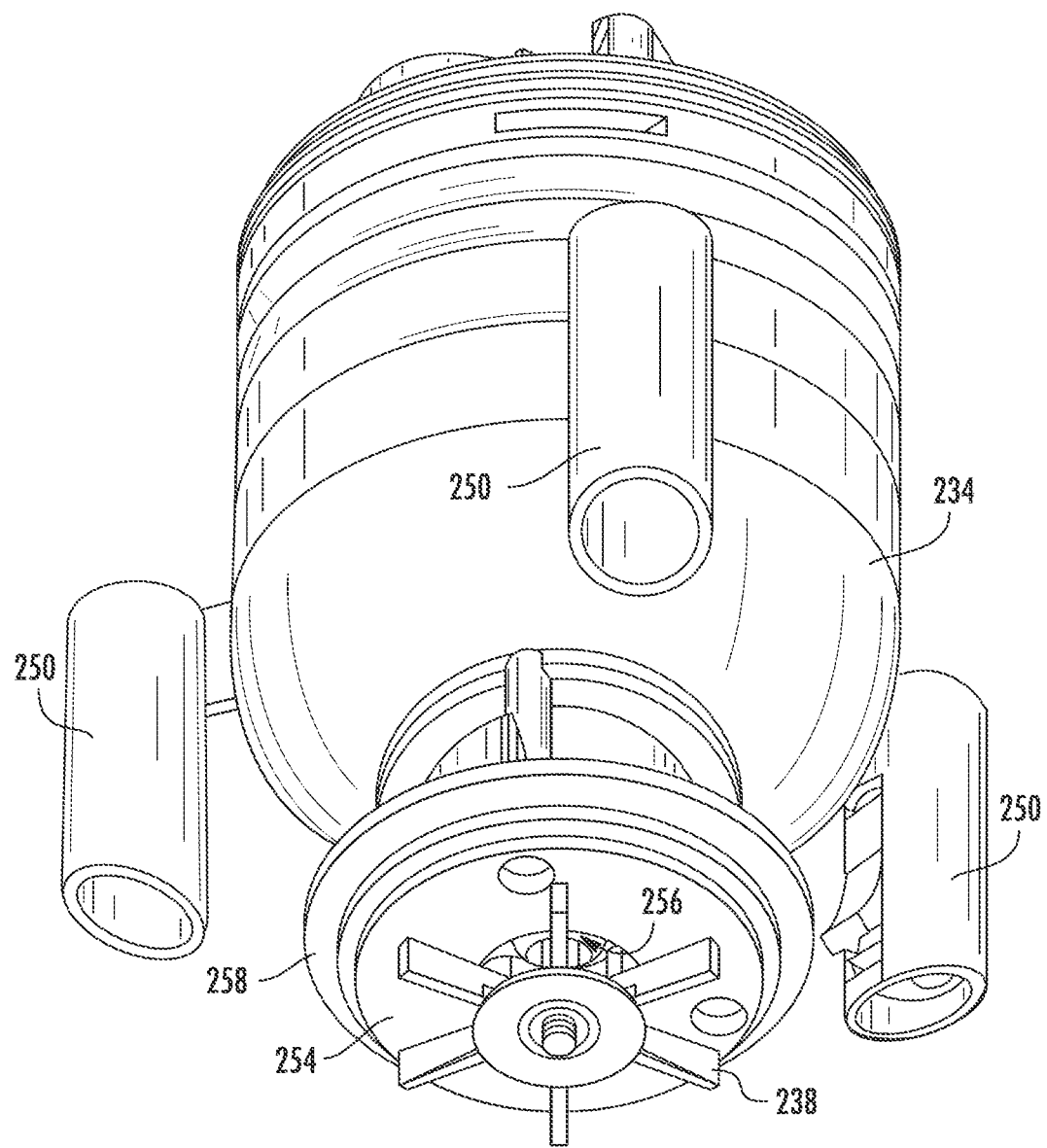
FIG. 5 provides a bottom perspective view of the exemplary pump assembly of FIG. 4.
Figure 6:
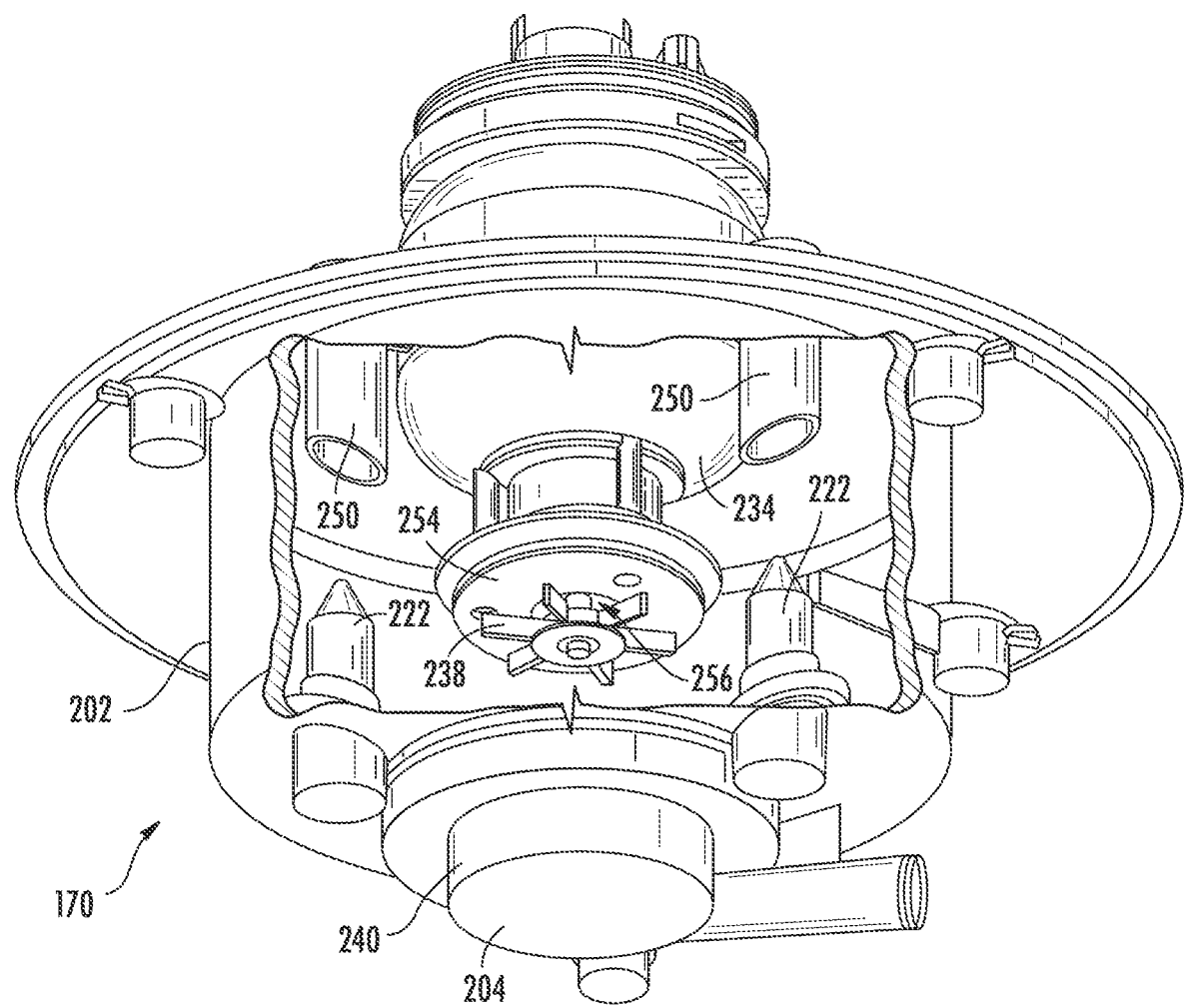
FIG. 6 provides a bottom perspective view of the exemplary sump of FIG. 3, with the pump partially removed therefrom and a bottom portion of the sump removed for the sake of clarity.

Turning now to FIGS. 2 through 8, FIGS. 3 and 6 through 8 provide various views of the sump 170, including a pump assembly 200 and housing 234 therefor. FIGS. 4 and 5 provide various views of portions of the pump assembly 200 in isolation from sump 170.

As noted above, sump 170 is positioned at a bottom portion 112 of tub 104 (FIG. 2) along the vertical direction V. Sump 170 defines an axial direction A that may be, for example, parallel to the vertical direction V. Optionally, sump 170 is formed integrally with a bottom wall 142 of tub 104. However, in other embodiments, sump 170 may instead be formed separately from bottom wall 142 of tub 104 and attached to bottom wall 142 of tub 104 in any suitable manner. Additionally, sump 170 may have any other suitable orientation.

As shown, sump 170 includes a side wall 202 and a bottom wall 204. Sidewall 202 may define a substantially cylindrical shape along the axial direction A, although in other embodiments, sidewall 202 may instead define any other suitable shape, such as a frustoconical shape, or alternatively an inverted frustoconical shape along the axial direction A.

In exemplary embodiments, bottom wall 204 extends radially inward from sidewall 202 and defines a recessed chamber 206 bounded by walls 202, 204. Recessed chamber 206 is defined at its perimeter by a rim portion of bottom wall 204 extending downward generally downward (e.g., toward the axial direction A or parallel thereto). Recessed chamber 206 also defines an opening 210 having, for example, a generally circular shape. Moreover, bottom wall 204 defines a drain opening 208 in a portion that opens into the recessed chamber 206.

In some embodiments, a filter assembly is positioned at least partially within sump 170 along the axial direction A (e.g., with or as a portion of pump assembly 200). The filter assembly may include multiple panels, such as a side panel 212, a bottom panel 214, or a top panel (not pictured). One or more of side panel 212, bottom panel 214, and top panel may include a filter medium defining a plurality of openings or pores configured to allow wash fluid to pass therethrough while preventing soils, such as food particles or other debris, larger than a predetermined size to pass therethrough. For example, in certain embodiments, one or more of side panel 212, bottom panel 214, and the top panel may include a fine mesh material.

In exemplary embodiments, a circulation pump 154 is included within pump assembly 200. More particularly, circulation pump 154 includes a fluid impeller (e.g., circulation impeller 232) and a chamber pump housing 234. When assembled, circulation impeller 232 is positioned within pump assembly 200 and is enclosed by chamber pump housing 234. In some embodiments, circulation pump 154, including chamber pump housing 234, is held in position along the axial direction A by one or more elastomer columns 222.

In optional embodiments, pump housing 234 defines a plurality of internal channels 236 that are downstream of impeller 232 and in fluid communication with circulation conduit 226 (FIG. 2). Thus, internal channels 236 are in fluid communication with one or more of the spray assemblies 142, 148, 150). Internal channels 236 may direct a flow F of wash fluid from circulation impeller 232 to the circulation conduit 226 (e.g., during a circulation cycle). Optionally, one or more diffuser vanes extend (e.g., radially) within chamber pump housing 234 to convert a velocity head of flow F to a static head within internal channels 236. In exemplary embodiments, circulation pump 154 is positioned at least partially within the filter assembly (e.g., within one or more of the panels thereof).

As illustrated, some embodiments include an electric motor 242 is mounted within a portion of the sump 170. For instance, the electric motor 242 may be enclosed within a portion of chamber pump housing 234 radially inward from the diffuser vane(s).

In some embodiments, the one or more elastomer columns 222 may generally extend vertically or otherwise parallel to the axial direction A between chamber pump housing 234 and the bottom wall 204 of sump 170. Optionally, the one or more elastomer columns 222 extend from chamber pump housing 234 through recessed chamber 206 to bottom wall 204 of sump 170. As shown, chamber pump housing 234 may be held or supported on the elastomer columns 222. For instance, chamber pump housing 234 may include one or more support tubes 250 circumferentially positioned about chamber pump housing 234 (e.g., radially outward relative to internal channels 236). Each support tube 250 may generally correspond to and selectively receive one of the elastomer columns 222. When received within the support tubes 250, elastomer columns 222 may provide supportive engagement with the chamber pump housing 234. In particular, substantially all of the mass or weight of chamber pump housing 234 may be directed to, or otherwise borne, by elastomer columns 222.

As noted above, a wireless power transmitter 312 is provided in operable communication with wireless power receiver 314. In some embodiments, wireless power receiver 314 may be mounted or disposed within the wash chamber 106 while wireless power transmitter 312 is mounted or disposed outside of wash chamber 106. For instance, the inner liner of tub 104 may be electrically sealed such that no electrical wires or busses pass through tub 104 to electric motor 242. Additionally or alternatively, electric motor 242 may be electrically sealed within sump 142 or chamber 106. In some such embodiments, electric motor 242 is sealed or potted (e.g., using a suitable insulating material, such as an unsaturated polyester) within an inner cavity of chamber pump housing 234. Advantageously, a potential failure or leak point at tub or electric motor 242 may be avoided.

Generally, wireless power transmitter 312 and wireless power receiver 314 may be configured to exchange an electromagnetic field that generates an electrical current. For instance, wireless power transmitter 312 may transmit an electromagnetic field (e.g., as initiated by controller 137) that is received at wireless power receiver 314. At wireless power receiver 314, an electrical current or voltage may be generated and, subsequently transmitted to electric motor 242 (e.g., through an on-board rectifying circuit or activation circuit). For instance, the electromagnetic field may induce an electrical current at wireless power receiver 314. Thus, the wireless power transmitter 312 and wireless power receiver 314 may be a matched pair of resonant induction coils. Nonetheless, it is understood that any other suitable wireless power transmission method (e.g., inductive coupling, capacitive coupling, etc.) may be used.

In certain embodiments, rotation or activation of electric motor 242 (and thus any associated impellers 232, 238) is controlled, at least in part, by controller 137. For instance, controller 137 may be in operable communication with electric motor 242 wireless and configured to initiate a motorized spray movement at the electric motor 242. The operable communication between electric motor 242 and controller 137 may be direct (e.g., via a wireless data connection) or indirect (e.g., via electromagnetic field communication supplied from wireless power transmitter 312).

In optional embodiments, rotation or activation of motor 242 initiated at controller 137 may include directing a signal or voltage to wireless power transmitter 312 in order to generate the electromagnetic field therefrom. In some such embodiments, activation of electric motor 242 is controlled entirely on the electrical current directed thereto. Alternatively, a secondary controller may be mounted on electric motor 242. The secondary controller may be configured to control the rotation of electric motor 242 (e.g., by controlling rotation direction or speed of electric motor 242) when power is supplied thereto (e.g., from a current induced at wireless power receiver 314). Thus, electric motor 242 may be communicatively isolated from controller 137. Notably, a complex transmission of data signals from controller 137 to electric motor 242 may be avoided.

In additional or alternative embodiments, rotation or activation of electric motor 242 may be contingent on one or more programmed restriction conditions, such as door 120 being in the closed position. When door 120 is in the closed position (e.g., as determined at any position sensor or latch assembly engaged with door 120), controller 137 may direct or permit wireless power transmitter 312 to initiate an electromagnetic field to be transmitted therefrom. The transmitted electromagnetic field may then be received by the wireless power receiver 314 to generate a corresponding electrical current, which can activate electric motor 242. By contrast, when door 120 is in the closed position, controller 137 may restrict transmission of the electromagnetic field from wireless power transmitter 312 (e.g., by halting any current or voltage to wireless power transmitter 312). Thus, communication between wireless power transmitter 312 and wireless power receiver 314 is restricted in the open position of the door 120. Optionally, the electric motor 242 may be an electrically isolated assembly. In particular, electric motor 242 may be electrically isolated such that no electrical power storage (e.g., electrical battery or ultracapacitor) is provided thereon. Thus, in the absence of wireless communication with wireless power transmitter 312, electric motor 242 may be free of a current or voltage therethrough, advantageously preventing unintended operation (e.g., when door 120 is in the open position).

In some embodiments, pump assembly 200 includes a drain pump 156, which itself includes a fluid impeller (e.g., drain impeller 238) and a drain pump housing 240. When assembled, drain impeller 238 may be enclosed by drain pump housing 240, and drain pump housing 240 is attached to or otherwise formed by sump 170. More particularly, drain pump housing 240 is positioned below and in fluid communication with the recessed chamber 206 defined by bottom wall 204 of sump 170 assembly through a drain opening 208 of bottom wall 204 of sump 170. In certain exemplary embodiments, drain pump housing 240 may be formed integrally with sump 170, or alternatively may be attached to sump 170 in any suitable manner.

As shown, a volute cover 254 may be positioned over or across at least a portion of drain opening 208. In some embodiments, volute cover 254 is mounted to chamber pump housing 234 (e.g., via one or more adhesives, mechanical fasteners, or integral unitary members). When assembled, volute cover 254 may thus be positioned between electric motor 242 and drain impeller 238 (e.g., along the axial direction A). A cover opening or inlet 256 is defined through volute cover 254 (e.g., along the axial direction A or a direction that is parallel or otherwise nonorthogonal to the vertical direction V). Fluid communication and a flow F between recessed chamber 206 and drain pump housing 240 may thus be permitted through the cover inlet 256.

In some embodiments, volute cover 254 includes a radial flange 258 (e.g., along a radial or outer perimeter of volute cover 254). For instance, radial flange 258 may be disposed about the axial direction A at a radial outermost portion of volute cover 254. When assembled, radial flange 258 may be positioned, at least in part, above an elastomer seal 260 that extends about or around drain opening 208.

As shown, an elastomer seal 260 may be mounted on sump 170 (e.g., on bottom wall 204) at a position that is generally higher than drain impeller 238 relative to the vertical direction V or axial direction A. Elastomer seal 260 may further be positioned, at least in part, between radial flange 258 and recessed chamber 206 (or between radial flange 258 and drain impeller 238) along the axial direction A. In some embodiments, elastomer seal 260 includes a ring support body and an interface surface extending therefrom. For instance, interface surface may extend radially inward from ring support body toward the axial direction A.

In some embodiments, pump assembly 200 includes an axial shaft 244 engaged (e.g., in mechanical communication) with electric motor 242. During operations, axial shaft 244 may thus be rotated by electric motor 242. As shown, electric motor 242 may be positioned above drain impeller 238 or circulation impeller 232 (e.g., along the vertical direction V or axial direction A). Moreover, circulation impeller 232 may be positioned above volute cover 254. In exemplary embodiments, axial shaft 244 extends through circulation impeller 232, through volute cover 254 (e.g., at cover inlet 256), and into drain impeller 238 along the axial direction A. Axial shaft 244 may be selectively engaged (e.g., in mechanical communication) with drain impeller 238 and circulation impeller 232, such that rotation of axial shaft 244 rotates drain impeller 238 or rotates circulation impeller 232.

In optional embodiments, circulation pump 154 may include a one-way clutch (not shown) in mechanical communication with circulation impeller 232 and axial shaft 244. When axial shaft 244 is rotated in a first direction by electric motor 242, the one-way clutch of circulation impeller 232 is configured to engage circulation impeller 232 and rotate circulation impeller 232. Alternatively, circulation impeller 232 may be fixed to axial shaft 244 (e.g., such that rotation of axial shaft 242 in either a first or second direction rotates circulation impeller 232).

In additional or alternative embodiments, drain pump 156 further includes a one-way clutch 268 in mechanical communication with drain impeller 238 and axial shaft 244. When axial shaft 244 is rotated in a second direction by electric motor 242, the second direction being an opposite direction of the first direction, the one-way clutch 268 of the drain impeller 238 is configured to engage drain impeller 238 and rotate drain impeller 238. In some such embodiments, only one of circulation pump 154 and drain pump 156 may be activated at a given time. Alternatively, drain impeller 238 may be fixed to axial shaft 244 (e.g., such that rotation of axial shaft 242 in either a first or second direction rotates drain impeller 238).

Advantageously, the present the filter assembly, including electric motor 242 and impellers 232, 238 may be assembled by lowering chamber pump housing 234 into sump 170, without requiring a separate electric motor in an area below recessed chamber 206, or without requiring access to the same. Additionally or alternatively, most, if not all, of the pump assembly 200 (e.g., electric motor 242, chamber pump housing 234, volute cover 254, and impellers 232, 238) may be preassembled prior to being mounted within sump 170.

Figure 7:
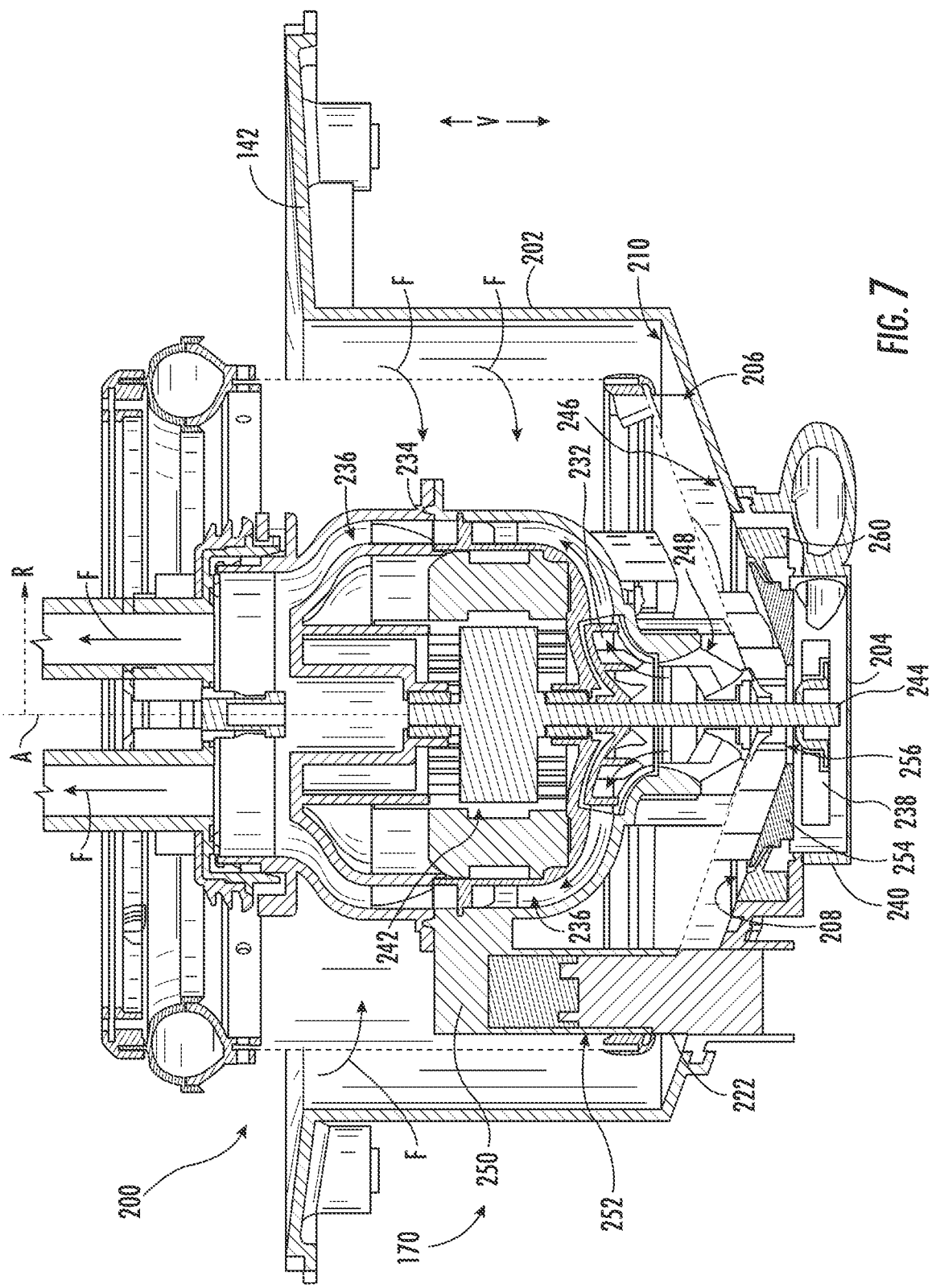
FIG. 7 provides a cross-sectional view of the exemplary sump of FIG. 3 during a circulation cycle.

Referring now particularly to FIG. 7, sump 170 is depicted during operation of circulation pump 154 (FIG. 2), such as during a circulation cycle (e.g., wash or rinse cycle) of the exemplary dishwashing appliance 100. During operation of circulation pump 154, a passage 246 may be defined between bottom panel 214 of the filter assembly and bottom wall 204 of sump 170. As shown, passage 246 may further extend between bottom panel 214 and volute cover 254. Passage 246 generally allows for wash fluid to access bottom panel 214 of the filter assembly. Accordingly, during operation of circulation pump 154, impeller 232 of circulation pump 154 may pull a flow of wash fluid F through the filter assembly (e.g., through the top panel, side panel 212, or bottom panel 214, such that wash fluid flows inwardly through the panels). From passage 246, fluid may flow into chamber pump housing 234 through inlet 248. Within chamber pump housing 234, fluid may flow through internal channels 236. From the internal channel 236, fluid may continue to flow downstream (e.g., to one or more of the spray assemblies 142, 148, 150).

During operation of circulation pump 154, soils in wash fluid may gravitate towards recessed chamber 206 defined in bottom wall 204 of sump 170. For example, an inlet 248 of circulation pump 154 is positioned adjacent bottom panel 214 of the filter assembly, and thus wash fluid may first be pulled through bottom panel 214 of the filter assembly. Additionally or alternatively, as recessed chamber 206 is positioned at a bottom of sump 170, gravitational forces may also cause soils to gravitate towards recessed chamber 206. Such a configuration may allow for efficient draining and cleaning of sump 170, as the drain opening 208 opens into recessed chamber 206 defined by bottom wall 204. As shown, bottom wall 204 may include or be provided as a solid continuous surface. Thus, at least a portion of the bottom wall 204 (e.g., a lowermost surface thereof, which is directly beneath recessed chamber 206 and impeller 238) may be free of an openings or apertures (e.g., vertical openings) through which water may pass.

Figure 8:
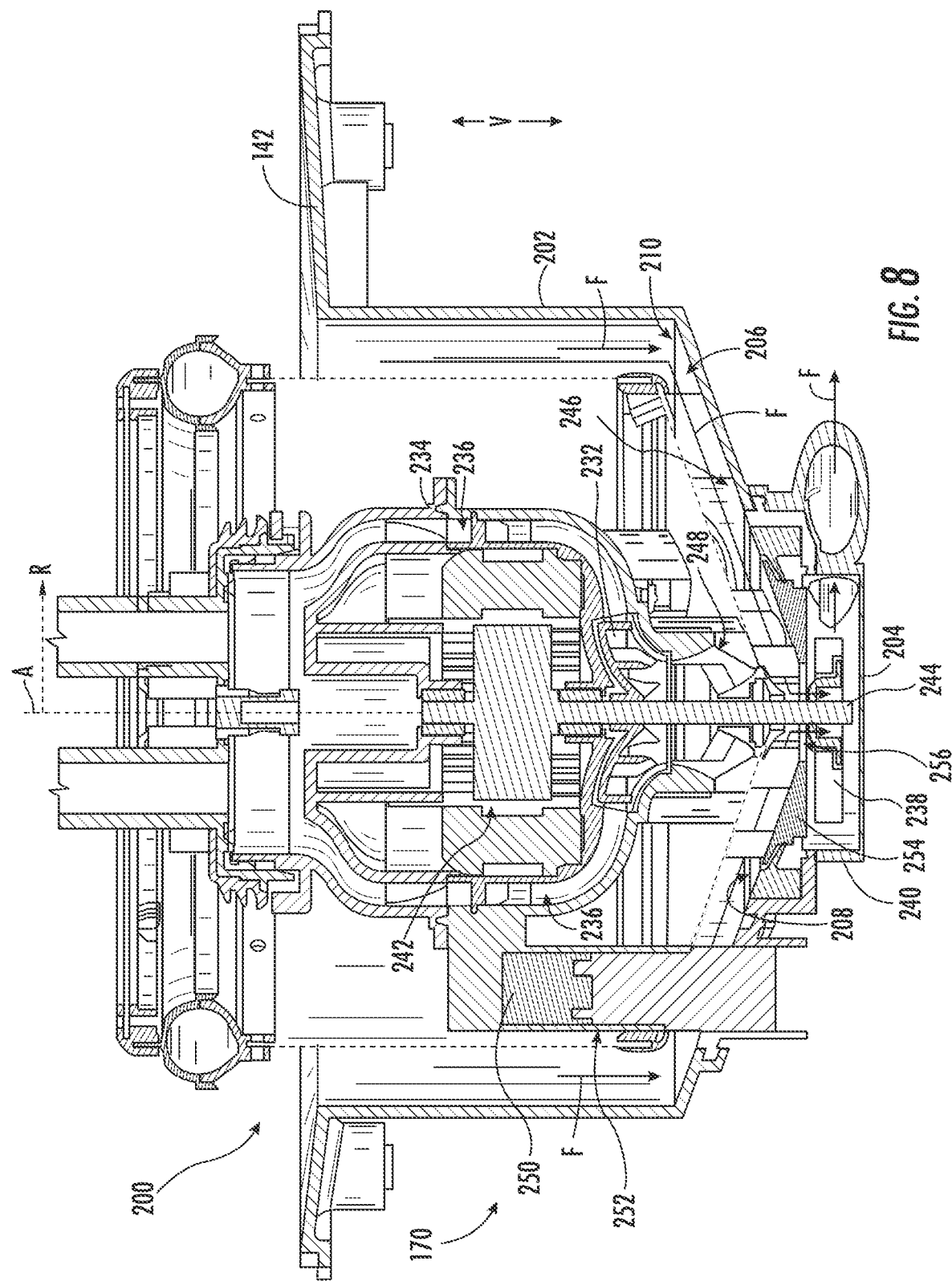
FIG. 8 provides a cross-sectional view of the exemplary sump of FIG. 3 during a drain cycle.

Referring now particularly to FIG. 8, sump 170 is depicted during operation of drain pump 156 (FIG. 2), such as during a drain cycle of the exemplary dishwashing appliance 100. During operation of drain pump 156, a flow of wash fluid F may be pulled from sump 170 through recessed chamber 206 in bottom wall 204 of sump 170 and through drain pump opening 208 of bottom wall 204. As many of the soils may be positioned in recessed chamber 206, drain pump 156 may expel the soils previously gathered in recessed chamber 206 of bottom wall 204 more quickly and may leave less soils behind for subsequent cycles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance defining a vertical direction, the dishwashing appliance comprising:
   a cabinet;
   a tub defining a wash chamber within the cabinet;
   a fluid pump in fluid communication with the tub for motivating a flow of wash fluid from the tub when activated, the fluid pump comprising
      a fluid impeller rotatably positioned in fluid communication with the wash chamber, and
      an electric motor in mechanical communication with the fluid impeller to motivate rotation thereof;
   a wireless power receiver in electrical communication with the electric motor; and
   a wireless power transmitter spaced apart from the wireless power receiver in operable communication with the wireless power receiver to transmit an electromagnetic field thereto.

2. The dishwashing appliance of claim 1, further comprising:
a sump positioned at a bottom portion of the tub along the vertical direction, the sump comprising a bottom wall defining a recessed chamber, wherein the electric motor is mounted within the sump.

3. The dishwashing appliance of claim 2, wherein the electric motor is disposed above the impeller.

4. The dishwashing appliance of claim 2, wherein a portion of the bottom wall directly beneath the fluid impeller comprises a solid continuous surface.

5. The dishwashing appliance of claim 1, wherein the wireless power receiver is disposed within the wash chamber.

6. The dishwashing appliance of claim 1, wherein the wash chamber is electrically sealed.

7. The dishwashing appliance of claim 1, wherein the fluid impeller is a first impeller, and wherein the dishwashing appliance further comprises:
an axial shaft connecting the electric motor to the first impeller; and
a second impeller mounted above a volute cover and on the axial shaft to rotate therewith.

8. The dishwashing appliance of claim 7, wherein the second impeller is positioned between the electric motor and the first impeller along the axial direction.

9. The dishwashing appliance of claim 1, wherein the electric motor is a direct current (DC) motor configured to receive a DC voltage.

10. The dishwashing appliance of claim 9, wherein the DC motor has a power rating less than or equal to 50 watts.

11. A dishwashing appliance defining a vertical direction, the dishwashing appliance comprising:
a cabinet;
a tub defining a wash chamber within the cabinet;
a fluid pump in fluid communication with the tub for motivating a flow of wash fluid from the tub when activated, the fluid pump comprising
a fluid impeller rotatably positioned in fluid communication with the wash chamber, and
an electric motor mounted within the wash chamber in mechanical communication with the fluid impeller to motivate rotation thereof;
a wireless power receiver mounted within the wash chamber in electrical communication with the electric motor; and
a wireless power transmitter mounted to the cabinet outside of the tub in operable communication with the wireless power receiver to transmit an electromagnetic field thereto.

12. The dishwashing appliance of claim 11, further comprising:
a sump positioned at a bottom portion of the tub along the vertical direction, the sump comprising a bottom wall defining a recessed chamber, wherein the electric motor is mounted within the sump.

13. The dishwashing appliance of claim 12, wherein the electric motor is disposed above the impeller.

14. The dishwashing appliance of claim 12, wherein a portion of the bottom wall directly beneath the fluid impeller comprises a solid continuous surface.

15. The dishwashing appliance of claim 11, wherein the wireless power receiver is disposed within the wash chamber.

16. The dishwashing appliance of claim 11, wherein the wash chamber is electrically sealed.

17. The dishwashing appliance of claim 11, wherein the fluid impeller is a first impeller, and wherein the dishwashing appliance further comprises:
an axial shaft connecting the electric motor to the first impeller; and
a second impeller mounted above a volute cover and on the axial shaft to rotate therewith.

18. The dishwashing appliance of claim 17, wherein the second impeller is positioned between the electric motor and the first impeller along the axial direction.

19. The dishwashing appliance of claim 1, wherein the electric motor is a direct current (DC) motor configured to receive a DC voltage.

20. The dishwashing appliance of claim 19, wherein the DC motor has a power rating less than or equal to 50 watts.

\* \* \* \* \*